(12) United States Patent
Ramamurthi et al.

(10) Patent No.: US 10,159,075 B2
(45) Date of Patent: Dec. 18, 2018

(54) BAND ASSIGNMENT FOR USER EQUIPMENT ON MULTIBAND ADVANCED WIRELESS COMMUNICATIONS NETWORKS

(71) Applicant: Verizon Patent and Licensing Inc., Basking Ridge, NJ (US)

(72) Inventors: Vishwanath Ramamurthi, San Ramon, CA (US); Arda Aksu, Lafayette, CA (US); Ozgur Dural, Sunnyvale, CA (US); Sanyogita Shamsunder, Basking Ridge, NJ (US); Yuexin Dong, Highland Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/476,073

(22) Filed: Mar. 31, 2017

(65) Prior Publication Data

US 2018/0288764 A1 Oct. 4, 2018

(51) Int. Cl.
| | |
|---|---|
| H04W 72/04 | (2009.01) |
| H04W 72/08 | (2009.01) |
| H04W 24/08 | (2009.01) |
| H04W 24/10 | (2009.01) |
| H04L 12/26 | (2006.01) |
| H04L 5/00 | (2006.01) |
| H04W 88/08 | (2009.01) |

(52) U.S. Cl.
CPC ....... *H04W 72/0453* (2013.01); *H04L 5/0048* (2013.01); *H04L 43/0894* (2013.01); *H04W 24/08* (2013.01); *H04W 24/10* (2013.01); *H04W 72/085* (2013.01); *H04W 88/085* (2013.01)

(58) Field of Classification Search
CPC ............. H04W 72/0453; H04W 24/08; H04W 72/085; H04W 24/10; H04W 88/085; H04L 5/0048; H04L 43/0894
See application file for complete search history.

(56) References Cited

U.S. PATENT DOCUMENTS

| | | | | |
|---|---|---|---|---|
| 6,133,879 | A * | 10/2000 | Grangeat | H01Q 1/24 343/700 MS |
| 2004/0106407 | A1* | 6/2004 | Kikuma | H04W 36/22 455/436 |
| 2006/0063533 | A1* | 3/2006 | Matoba | H04L 5/0005 455/452.2 |
| 2009/0180403 | A1* | 7/2009 | Tudosoiu | H04B 1/006 370/278 |

(Continued)

*Primary Examiner* — Kamran Afshar
*Assistant Examiner* — Minjung Kim

(57) ABSTRACT

Systems, methods, and devices for assigning user equipment to frequency bands on multiband advanced wireless communication networks. The system may include a multiband controller configured to obtain signal quality indicators from user equipment devices for signals received by the user equipment devices from a first remote radio head for a first frequency band having a maximum frequency greater than 24 GHz and a second remote radio head having a minimum frequency at least 2 GHz greater than the maximum frequency, and in response to the signal quality indicators, issue a command to a user equipment device included in the user equipment devices and operating in the first frequency band to switch to operating in the second frequency band.

20 Claims, 8 Drawing Sheets

(56) References Cited

U.S. PATENT DOCUMENTS

| | | | | |
|---|---|---|---|---|
| 2010/0197310 A1* | 8/2010 | Jung | ................... | H04W 36/30 |
| | | | | 455/436 |
| 2010/0210213 A1* | 8/2010 | Pawar | ................... | H04L 5/0044 |
| | | | | 455/62 |
| 2010/0273432 A1* | 10/2010 | Meshkati | .............. | H04W 16/16 |
| | | | | 455/67.11 |
| 2011/0110453 A1* | 5/2011 | Prasad | ................. | H04B 7/0695 |
| | | | | 375/285 |
| 2013/0308583 A1* | 11/2013 | Ogawa | ................. | H04L 5/0007 |
| | | | | 370/329 |
| 2017/0171791 A1* | 6/2017 | Li | ......................... | H04W 24/08 |
| 2017/0188314 A1* | 6/2017 | Mueck | ................ | H04W 52/243 |
| 2017/0347358 A1* | 11/2017 | Raghavan | ............ | H04B 7/0874 |
| 2018/0034517 A1* | 2/2018 | Hart | .................... | H04B 7/0452 |

* cited by examiner

BAND ASSIGNMENT FOR USER EQUIPMENT ON MULTIBAND ADVANCED WIRELESS COMMUNICATIONS NETWORKS

BACKGROUND

Advanced wireless communication systems and services, such as 5G (fifth generation) systems and service, include use of millimeter wave frequency-based radio communication between radio stations and user equipment (UE) devices (including, for example, mobile stations (MS) or customer premise equipment (CPE) devices). The term "millimeter wave" (as well as the terms "mmWave," "mmwave," and "mmW") applies to frequency bands in the range of 30-300 GHz, as well as more broadly to include a number of frequency bands in the 24-30 GHz range (for example, a frequency band from 27.5-28.35 GHz band referred to as the "28 GHz" band).

Wireless communications in millimeter wave frequency bands are qualitatively different from wireless communications in frequency bands below 6 GHz used for radio communication in older generations of radio access technologies (RATs), such as in various 4G LTE implementations, 3G UMTS implementations, and 2G GSM implementations. In contrast to frequency bands below 6 GHz, millimeter wave frequency bands tend to have high atmospheric attenuation, such as absorption by gases in the atmosphere, and also tend to be more severely affected by weather conditions such as rain (an effect referred to as "rain fading") or humidity. Also, the shorter wavelengths for millimeter wave frequency bands are more easily blocked by buildings, hands (for handheld mobile wireless communication devices), movement of people and vehicles, and bodies of users. As a result, although millimeter wave frequency bands offer high data rates, operation of a wireless communications network in millimeter wave frequency bands generally requires a greater base station density to overcome shorter range and increased likelihood of signal blocking. It is desirable to introduce improvements that reduce such impacts across a millimeter wave-based advanced wireless communication network and make effective user of available bands across users.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. The techniques described below provide solutions for efficient and effective assignments of UE devices to respective bands on multiband advanced wireless communications networks. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
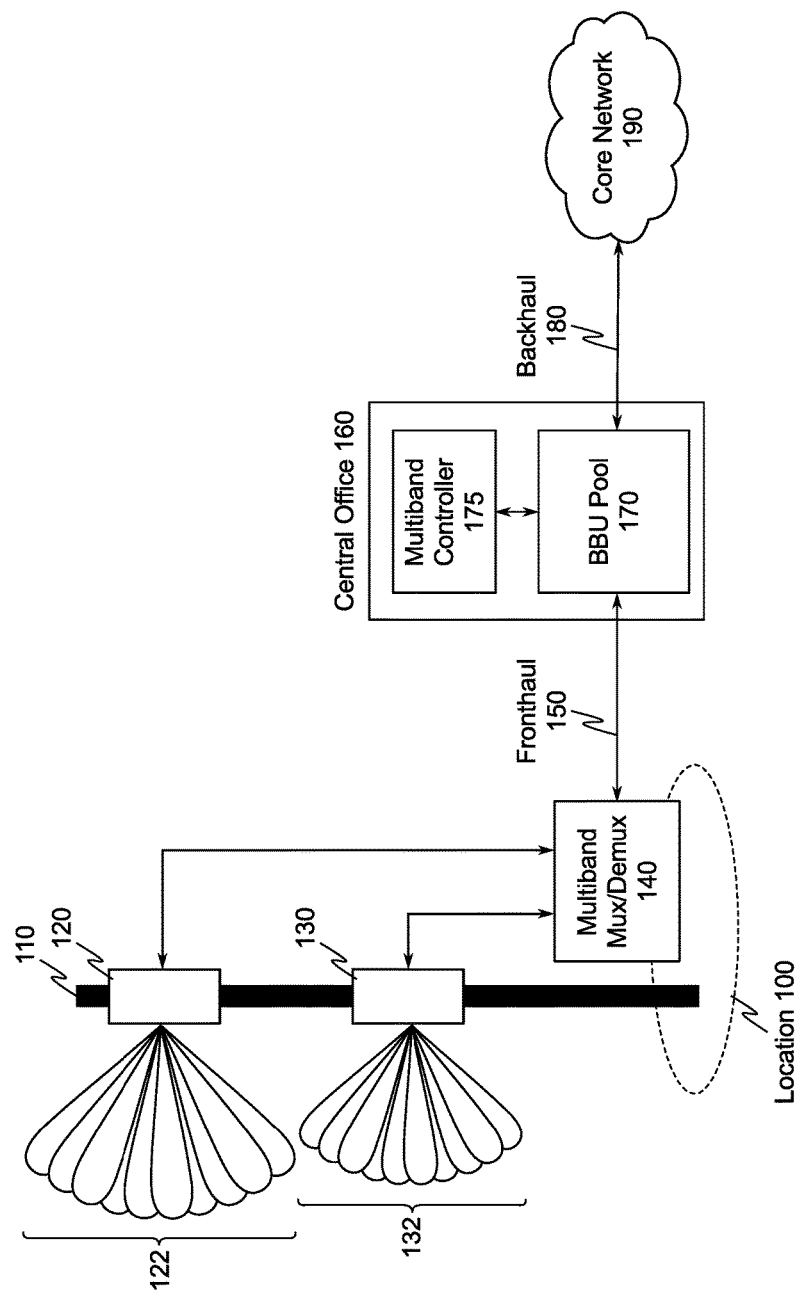
FIG. 1 illustrates an example of a system included in a multiband millimeter wave wireless communication network.

FIG. 1 illustrates an example of a system included in a multiband millimeter wave wireless communication network. At a first geographic location 100, a first remote radio head (RRH) 120 and a second RRH 130 are deployed, and a multiband multiplexer/demultiplexer 140 is also deployed and communicatively coupled to the first RRH 120 and the second RRH 130. The first and second RRHs 120 and 130 may both be deployed on a common structure 110 (such as, but not limited to, a cell station tower, a streetlight, or a building). The term "multiband," as used herein, refers to two or more frequency bands in which a multiband user device may access a wireless network. Thus, the term "multiband" may correspond to dual-band, tri-band, quad-band, etc. The term "frequency band," as used herein, is intended to be broadly interpreted to include a frequency, a frequency range, and/or a frequency spectrum. A frequency band may also be referred to as a "band." A frequency band may be divided in various ways, such as, for example, channels, resource slots, etc. A frequency band may correspond to a carrier. A frequency band, at least where it covers a frequency range or spectrum, has a minimum frequency and a maximum frequency. Hardware deployed together for a wireless communication network at a common geographical location, such the geographical location 100 in FIG. 1, may be collectively referred to as, or included in, a "base station," "cell station," "station," "deployment," or "installation." The arrangement of the first and second RRHs 120 and 130 on a common structure 110 may be referred to as a "single pole deployment."

The first RRH 120 is configured to operate, or is operated, in a first frequency band having a maximum frequency greater than 24 GHz for providing wireless communications services. In some examples, the first frequency band has a minimum frequency greater than 24 GHz, or a minimum frequency greater than 30 GHz. In some examples, the first frequency band has a minimum frequency greater than 60 GHz, or a minimum frequency greater than 70 GHz; in such frequency bands, spatial multiplexing techniques become less effective, resulting in greater radio communication challenges.

A number of millimeter wave frequency bands have been considered for use in advanced wireless communications services. For example, in 2016, the Federal Communications Commission (FCC) in the United States proposed a number of frequency bands: 27.5-28.35 GHz (referred to as the "28 GHz" band or "28 GHz service"), 37.0-38.6 GHz (referred to as the "37 GHz" band or "37 GHz service"), 38.6-40.0 GHz (referred to as the "39 GHz" band or "39 GHz service"), and 64-71 GHz (as an unlicensed band). The FCC also requested comments on additional frequency bands including: 24.25-24.45 GHz, 24.75-25.25 GHz, 31.8-33.4 GHz, 42.0-42.5 GHz (referred to as the "42 GHz" band or "42 GHz service"), 47.2-50.2 GHz, 50.4-52.6 GHz, 71-76 GHz (referred to as the "73 GHz" band, the "70 GHz" band, or "70 GHZ service"), and 81-86 GHz (referred to as the "80 GHz" band or "80 GHz service"). In the United States, a frequency band at 92-95 GHz (referred to as the "90 GHz" band or "90 GHz service") may also be made available. In 2015, the International Telecommunication Union (ITU) released a list of proposed globally viable frequencies in which frequency bands might be formally defined: 24.25-27.5 GHz, 31.8-33.4 GHz, 37-40.5 GHz, 40.5-42.5 GHz, 45.5-50.2 GHz, 50.4-52.6 GHz, 66-76 GHz, and 81-86 GHz. Other frequency bands may be considered at higher frequencies, despite generally greater atmospheric attenuation; for example, frequency bands within about 130-170 GHz or within about 200-300 GHz. Such millimeter wave frequency bands may be used for the first frequency band for the first RRH 120 and a second frequency band for the second RRH 130. In some implementations, factors such as, but not limited to, antenna design, amplifier design, or regulatory approval may restrict the first RRH 120 to operating or being operated solely within the first frequency band.

The first RRH 120 may include a plurality of antenna elements used to perform directional beamforming to selectively direct signals transmitted by the first RRH 120. Signals transmitted at millimeter wave frequencies are highly directional, and the small wavelength facilitates constructing compact antenna arrays with many antenna elements, such as, for example, an 8×8 array of antenna elements. Accordingly, the first RRH 120 may transmit a signal in a selected one of a plurality of directional beams 122, or otherwise transmit the signal in a selected direction. The transmitted signal may encode an identifier for the directional beam, or otherwise indicate, expressly or implicitly, the direction in which the signal was transmitted by the first RRH 120.

The second RRH 130 is configured to operate, or is operated, in the above-noted second frequency band. The second frequency band is different from the first frequency band, with at least a portion of the second frequency band not overlapping the first frequency band, and has a minimum frequency greater than a minimum frequency of the first frequency band, and/or has a maximum frequency that is greater than a maximum frequency of the first frequency band. In some implementations, the second frequency band does not overlap the first frequency band, and a minimum frequency of the second frequency band is greater than a maximum frequency of the first frequency band. In some examples, the second frequency band has a minimum frequency greater than 60 GHz, or a minimum frequency greater than 70 GHz; as noted above, in such frequency bands, spatial multiplexing techniques become less effective, resulting in greater radio communication challenges. The second RRH 130 may include a plurality of antenna elements used to perform directional beamforming to selectively direct signals transmitted by the second RRH 120, much as discussed above for the first RRH 120. Accordingly, the second RRH 130 may transmit a signal in a selected one of a plurality of directional beams 132, or otherwise transmit the signal in a selected direction. In some implementations, factors such as, but not limited to, antenna design, amplifier design, or regulatory approval may restrict the second RRH 130 to operating or being operated solely within the second frequency band. In some implementations, the first RRH 120 may operate according to a first RAT (radio access technology) and the second RRH may operate according to a second RAT that is different from the first RAT. In some implementations, the first RRH 120 and the second RRH 130 may operate according to the same RAT.

Since the second RRH 130 operates in a different frequency band than first RRH 120, there may be circumstances in which although the first RRH 120 is unable to successfully communicate with (or fails to achieve a desired level of throughput or connectivity) a UE device in the first frequency band, the second RRH may nevertheless be effective (or more effective) for communicating with the UE device in the second frequency band. Likewise, the first RRH 120 may be effective for communicating with a UE device at a time that the second RRH 130 is not effective (or not sufficiently effective) for communicating with the UE device. This use of two RRHs communicating in different frequency bands may be effective for reducing a total number of stations needed to provide a desired level of service in a region, and as a result reduce efforts and resources involved in building, operating, maintaining, and upgrading a wireless communication network. To improve the likelihood that such benefits of frequency diversity are obtained, in some implementations not only do the first and second frequency bands not overlap, but there also is a significant gap between the first and second frequency bands. This can particularly useful where the first frequency band and/or the second frequency band have a minimum frequency greater than 60 GHz, or a minimum frequency greater than 70 GHz. In some examples, a difference between a minimum frequency of the second frequency band and a maximum frequency of the first frequency band is at least 1 GHz (as a result, the above-noted gap is at least 1 GHz, and the second frequency band has a minimum frequency at least 1 GHz greater than the maximum frequency of the first frequency band). In some examples, the difference or gap is at least 2 GHz. In some examples, the difference or gap is at least 5 GHz. In some examples, the difference or gap is at least 8 GHz. In a particular example, the first frequency band for the first RRH 120 may be the above-noted "28 GHz" band (having a minimum frequency of 27.5 GHz and a maximum frequency of 28.35 GHZ) and the second frequency band for the second RRH 130 may be the above-noted "39 GHz" band (having a minimum frequency of 38.6 GHz and a maximum frequency of 40.0 GHZ), with a difference or gap of approximately 10 GHz. In some examples, the difference or gap is at least 20 GHz. In some examples, the difference or gap is at least 30 GHz. In some examples, the difference or gap is at least 50 GHz. In some examples, the difference or gap is at least 100 GHz. In some implementations, such a difference may be measured between a respective center or other frequency in each of the first and second frequency bands.

There may be an overlap in directions and/or areas covered by both the first RRH 120 and the second RRH 130. This may improve the likelihood that one of the first and second RRHs 120 and 130 can communicate with a UE device at a time that the other one of the RRHs cannot communicate with the UE device. Additional RRHs, each configured to communicate in the first frequency band or the second frequency band, may also be deployed at geographical location 100 to increase the directions or areas that may be serviced by the base station at the geographical location 100.

The first and second RRHs 120 and 130 are communicatively coupled to, and interact with, a BBU (base band unit) pool 170 via a fronthaul 150 (which may be referred to as a "fronthaul connection," a "fronthaul network," or a "common fronthaul"). First RRH 120 may be configured to transmit signals in the first frequency band in accordance with radio transmit data, such as or including digital radio symbols, (for example, IQ data samples) received via fronthaul 150. First RRH 150 may be configured to receive signals from UE devices in the first frequency band and send corresponding radio receive data, such as or including digital radio symbols, to BBU pool 170 via fronthaul 150. Likewise, second RRH 130 may be configured to transmit signals in the second frequency band in accordance with radio transmit data, such as or including digital radio symbols, (for example, IQ data samples) received via fronthaul 150, and to receive signals from UE devices in the second frequency band and send corresponding radio receive data, such as or including digital radio symbols, to BBU pool 170 via fronthaul 150. Additionally, fronthaul 150 may be used for command and control communications between the BBU pool 170 and the first and second RRHs 120 and 130. Fronthaul 150 allows for a Cloud Infrastructure Radio Access Network (C-RAN)-like separation of radio elements (in this example, first and second RRHs 120 and 130) of the base station at geographic location 100 from the elements processing their base band signals (included in BBU pool 170). Fronthaul 150 may include, for example, an optical fiber-based network connection (for example, Digital Radio over Fiber (D-RoF) according to the Common Public Radio Interface (CPRI) or the Open Base Station Architecture Initiative (OBSAI) specifications), an RF-based network connection, or an Ethernet-based network connection (for example, in accordance with IEEE P1914.3 Radio over Ethernet). Backhaul 180 (which may be referred to as a "backhaul connection" or a "backhaul network") provides a communication link between mobile network resources, such as BBU pool 170 and MBC 175 located in CO 160, and core network 190.

In the example illustrated in FIG. 1, the base station at geographic location 100 includes multiband multiplexer/demultiplexer (mux/demux) 140, which is communicatively coupled to fronthaul 150 and the first and second RRHs 120 and 150. Multiband mux/demux 140 includes a demultiplexer configured to demultiplex signals received via fronthaul 150, and send portions of those signals to the first RRH 120 and portions of those signals to the second RRH 130. Multiband mux/demux 140 includes a multiplexer configured to receive first signals from the first RRH 120, receive second signals from the second RRH 130, and provide the first and second signals to BBU pool 170 via the fronthaul 150. A protocol for multiplexing signals for N bands on fronthaul 150 may include, for example, log 2(N) bits in a protocol header. In some implementations, the first RRH 120 or the second RRH 130 may include respective multiplexers and demultiplexers and be directly coupled to fronthaul 150, allowing multiband mux/demux 140 to be omitted.

Central Office (CO) 160 is at a geographic location separate from geographic location 100, and includes the BBU pool 170 and multiband controller (MBC) 175. The BBU pool 170 includes one or more BBUs (base band units) configured to process base band signals (received or for transmission) for the first and second RRHs 120 and 130. The BBU pool 170 may be configured to generate and send first radio transmit data, such as or including digital radio symbols, to the first RRH 120 for transmission by the first RRH 120 in the first frequency band, receive first radio receive data, such as or including digital radio symbols, from the first RRH 120 received by the first RRH 120 in the first frequency band, generate and send second radio transmit data, such as or including digital radio symbols, to the second RRH 130 for transmission by the second RRH 130 in the second frequency band, and receive second radio receive data, such as or including digital radio symbols, from the second RRH 130 received by the second RRH 130 in the second frequency band. In some implementations, the BBU pool 170 may be communicatively coupled to, and configured to interact with, additional RRHs at geographic locations other than the geographic location 100.

In the example illustrated in FIG. 1, MBC 175 is co-located and associated with BBU pool 170 at CO 160. MBC 175 is configured to manage switching UE devices among multiple millimeter wave frequency bands, such as the first and second frequency bands used by the first and second RRHs 120 and 130, respectively. MBC 175 obtains signal quality indicators from UE devices for signals received by the UE devices from RRHs associated with MBC 175, such as the first RRH 120 and the second RRH 130 in the example illustrated in FIG. 1. MBC 175 may be configured to, in response to the obtained signal quality indicators, issue band change commands or instructions to the UE devices to switch from operating from one frequency band to another; for example, from operating on the first frequency band to the second frequency band, or from the second frequency band to the first frequency band. MBC 175 may cause a band change command or instruction to be sent to a target UE device by issuing a command or instruction to BBU pool 170, which, in response to the command or instruction from MBC 175, generates radio transmit data, such as or including digital radio symbols, for an RRH associated with the target UE device. In some implementations, MBC 175 may be associated with additional BBU pools, such as BBU pools configured to process base band signals for RRHs at locations other than the geographical location 100.

Although not illustrated in FIG. 1, in some implementations there may be a third RRH deployed at geographical location 100 that is configured to operate, or is operated, in a third millimeter wave frequency band. In such implementations, the third frequency band may not overlap with either the first frequency band or the second frequency band. The third RRH may be deployed on the structure 100, along with the first and second RRHS 120 and 130. The third RRH operates much as described for the first RRH 120. The third RRH is communicatively coupled to, and interacts with, BBU pool 170 via multiband mux/demux 140 in much the same manner as the first and second RRHs 120 and 130. In some examples, the third frequency band has a minimum frequency that is greater than a maximum frequency of the second frequency band. In such examples, there may be a difference or gap between the second and third frequency bands in much the same manner described above for a difference or gap between the first and second frequency bands. There may be an overlap in directions and/or areas covered by the third RRH and the first RRH 120 and/or the second RRH 130. In some implementations, the third RRH may operate according to a different RAT than the first RRH 120 or the second RRH 130. BBU pool 170 and MBC 175 are further configured to interact with the third RRH and utilize the third frequency band. Additional RRHs, configured to operate, or which are operated, in millimeter wave frequency bands different from the first, second, and third frequency bands and each other, may likewise be deployed at geographical location 100.

Although FIG. 1 illustrates an example in which BBU pool 170 and MBC 175 are not deployed at geographical location 100 along with the first RRH 120 and the second RRH 130, in some implementations a BBU or a BBU pool may instead be deployed at geographical location 100 (also likely eliminating fronthaul 150 and multiband mux/demux 140 in favor of a direct connection between the BBU or BBU pool and the first and second RRHs 120 and 130), and in such implementations MBC 175 may also be deployed at geographical location 100. In some implementations, instead of a "remote radio head", a radio device or radio element may be used for the first RRH 120 and/or the second RRH 130.

Figure 2:
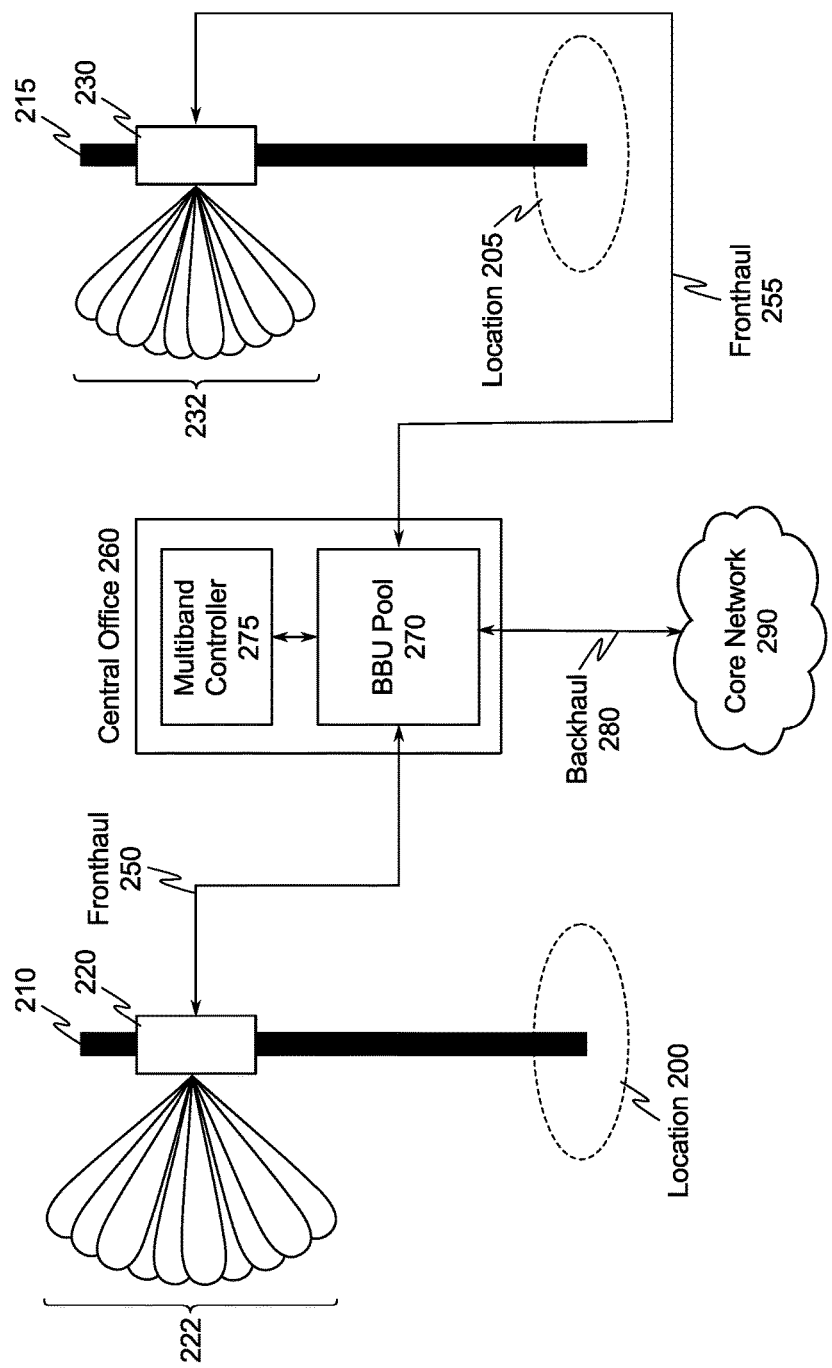
FIG. 2 illustrates an example of a system included in a multiband millimeter wave wireless communication network.

FIG. 2 illustrates an example of a system included in a multiband millimeter wave wireless communication network. Much as with the system illustrated in FIG. 1, the system illustrated in FIG. 2 includes a first RRH 220 configured to operate, or is operated, in a first millimeter wave frequency band, and a second RRH 230 configured to operate, or is operated, in a second millimeter wave frequency band that is different from the first frequency band, where the second frequency band has a minimum frequency greater than a minimum frequency of the first frequency band, and/or has a maximum frequency that is greater than a maximum frequency of the first frequency band. There may be a difference or gap between the first and second frequency bands for the first and second RRHs 220 and 230 as discussed in connection with the first and second frequency bands for the first and second RRHs 120 and 130 in FIG. 1. The first RRH 220 operates much as described in connection with the first RRH 120 in FIG. 1, including performing directional beamforming (for example, transmitting a signal in a selected one of a plurality of directional beams 222). The second RRH 230 operates much as described in connection with the second RRH 130 in FIG. 1, including performing directional beamforming (for example, transmitting a signal in a selected one of a plurality of directional beams 232). Much as discussed in connection with FIG. 1, there may be an overlap in directions and/or areas covered by both the first RRH 220 and the second RRH 230. BBU pool 270 operates much as described in connection with BBU pool 170 in FIG. 1, including processing base band signals for the first and second RRHs 220 and 230. MBC 275 is co-located in CO 260, and operates much as described in connection with MBC 175 in FIG. 1. Backhaul 280 and core network 290 serve the same roles as their counterparts, backhaul 180 and core network 190, in FIG. 1.

In contrast to the system in FIG. 1, the first and second RRHs 220 and 230 are deployed at different, geographically separated, geographic locations 200 and 205, respectively. As illustrated in FIG. 2, the first RRH 220 may be deployed on a structure 210, and the second RRH 230 may be deployed on a structure 215. Additionally, rather than sharing a common fronthaul connection with a common BBU pool (as done via fronthaul 150 in the system illustrated in FIG. 1), the first RRH 220 is communicatively coupled to, and interacts with, BBU pool 270 via a first fronthaul 250, and the second RRH 230 is communicatively coupled to, and interacts with, BBU pool 270 via a second fronthaul 255 that is different from the first fronthaul 250. The first and second fronthauls 250 and 255 may be implemented much as described for the fronthaul 150 illustrated in FIG. 1. In the example illustrated in FIG. 2, CO 260 is at a geographic location separate from both geographic locations 200 and 205.

Although not illustrated in FIG. 2, in some implementations there may be a third RRH deployed at a geographical location separate from geographic locations 200 and 205 that is configured to operate, or is operated, in a third millimeter wave frequency band. In such implementations, the third frequency band may not overlap with either the first frequency band or the second frequency band. The third RRH operates much as described for the first RRH 220. The third RRH is communicatively coupled to, and interacts with, BBU pool 270 via a respective third fronthaul connection. In some examples, the third frequency band has a minimum frequency that is greater than a maximum frequency of the second frequency band. In such examples, there may be a difference or gap between the second and third frequency bands in much the same manner described above for a difference or gap between the first and second frequency bands. There may be an overlap in directions and/or areas covered by the third RRH and the first RRH 220 and/or the second RRH 230. In some implementations, the third RRH may operate according to a different RAT than the first RRH 220 or the second RRH 230. BBU pool 270 and MBC 275 are further configured to interact with the third RRH and utilize the third frequency band. Additional RRHs, configured to operate, or which are operated, in millimeter wave frequency bands different from the first, second, and third frequency bands and each other, may likewise be deployed at respective separate geographical locations.

The multiband millimeter wave wireless communication network including the station at geographical location 200 with the first RRH 220 and the station at geographical location 205 with the second RRH 230 may include additional stations each configured much as described for the station at geographical location 100 in FIG. 1 (with multiple RRHs configured for different millimeter wave frequency bands deployed at a single geographic location, and possibly deployed on a common structure), the station at geographical location 200, the station at geographical location 205, or other stations described in connection with FIGS. 1 and 2. These additional stations may all be communicatively coupled to, and interact with, BBU pool 270. Some or all of the additional stations may be communicatively coupled to, and interact with, additional BBU pools, with the MBC 275 receiving signal quality indicators for the additional stations communicatively coupled to the additional BBU pools.

Figure 3:
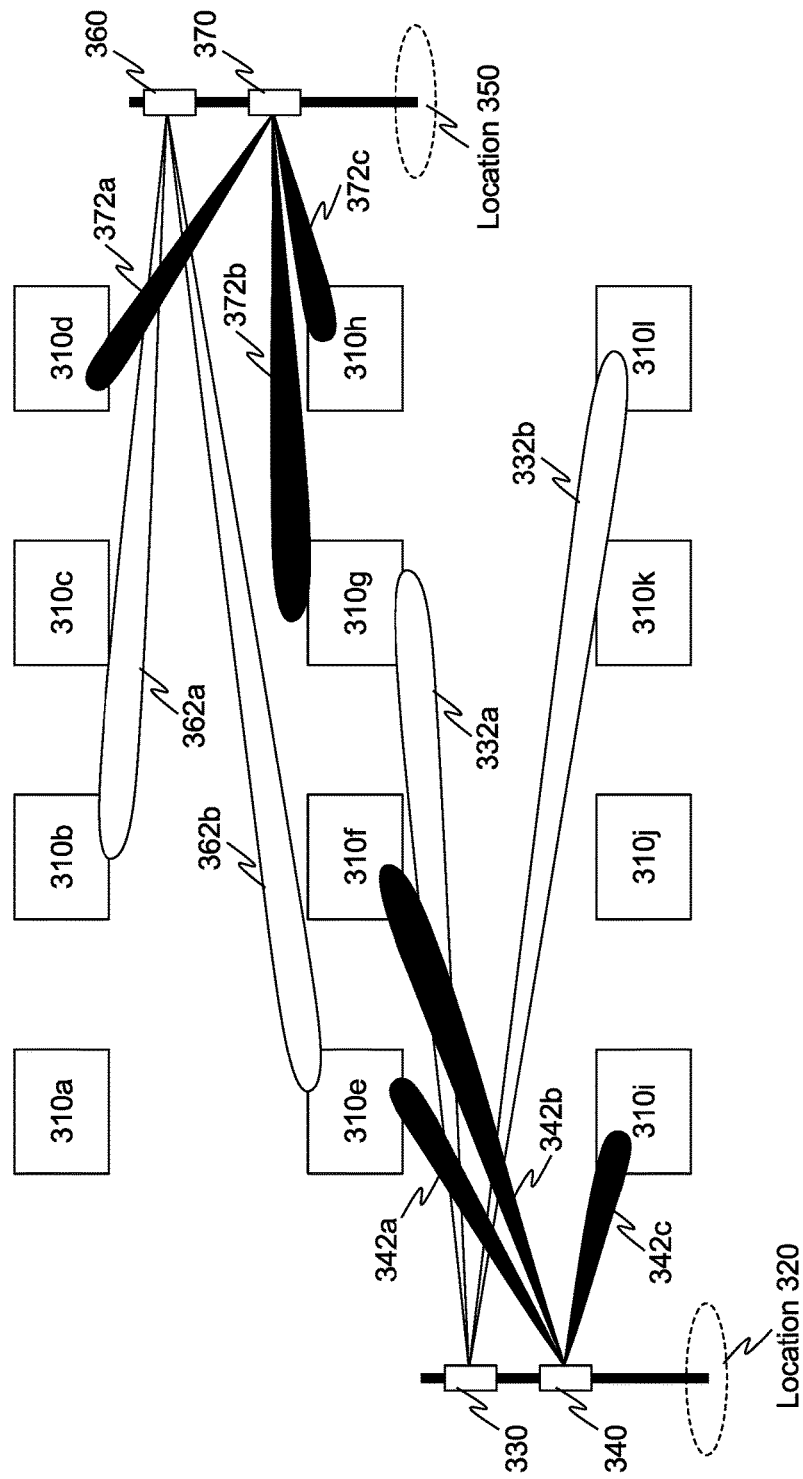
FIG. 3 illustrates an example deployment scenario.

FIG. 3 illustrates an example deployment scenario. FIG. 3 includes a first base station at a first geographical location 320 including RRH 330 and RRH 340, which operate much as described for their counterparts in FIG. 1, first RRH 120 and second RRH 130. FIG. 3 further includes a second base station at a second geographical location 330 including RRH 360 and RRH 370, which operate much as described for their counterparts in FIG. 1, first RRH 120 and second RRH 130. RRH 330 and RRH 360 use a first frequency band, and RRH 340 and RRH 370 use a second frequency band. As illustrated in FIG. 3, RRHs 330, 340, 360, and/or 370 may overlap in coverage, such as an overlap in area (for example, many of UE devices 310*a*-1, including UE devices 310*e*, 310*f*, and 310*g*, may receive coverage by at least one of RRHs 330 and 340 deployed the geographical location 320 and by at least one of RRHs 330 and 340 deployed the geographical location 350.

RRHs 330, 340, 360, and 370 transmit reference signals in various selected directions, and each reference signal may encode or otherwise indicate, expressly (for example, a beam or direction identifier) or implicitly (for example, a direction may be determined based on a time at which a reference signal was transmitted or received), a direction in which the reference signal was transmitted. A reference signal may include, for example, a calibration message or signal, or a message or signal directed to another UE device (but which may be used by another UE device to generate a receive metric based its observation of the message or signal). In the example illustrated in FIG. 3, the best beam (of those meeting a minimum receive metric threshold) observed for each band by UE devices 310a-310l is shown. UE devices 310a and 310j did not observe a beam (or any observations may not have met the minimum receive metric threshold). For UE devices 310b and 310c, beam 362a from RRH 360 was the best observed beam in the first frequency band, with no qualifying beam in the second frequency band. For UE device 310d, beam 372a from RRH 370 was the best observed beam in the second frequency band, with no qualifying beam in the first frequency band. For UE device 310e, beams 362b (first frequency band) and 342a (second frequency band) were best. For UE device 310f, beam 342b was best. For UE device 310g, beams 372b and 332a were best in their respective bands. For UE device 310h, beam 372c was best. For UE device 310i, beam 342c was best. For UE devices 310k and 310l, beam 332b was best. Such scanning of millimeter wave frequency bands by UE devices is discussed in more detail in connection with FIG. 4. In some implementations, the wireless communication network may allow a UE device with available beams in both the first and second frequency bands, such as UE devices 301e, 301f, and 310g, to concurrently make use of the first and second frequency bands; for example, one frequency band may be used for upstream data transfer and the other frequency band for downstream data transfer, or one frequency band for data transfer and the other frequency band for acknowledgements. In such implementations, an MBC, such as MBC 175, 275, or 675, may be configured to identify such UE devices and issue command or instructions to such UE devices to control such concurrent use of multiple frequency bands by a single UE device.

Figure 4:
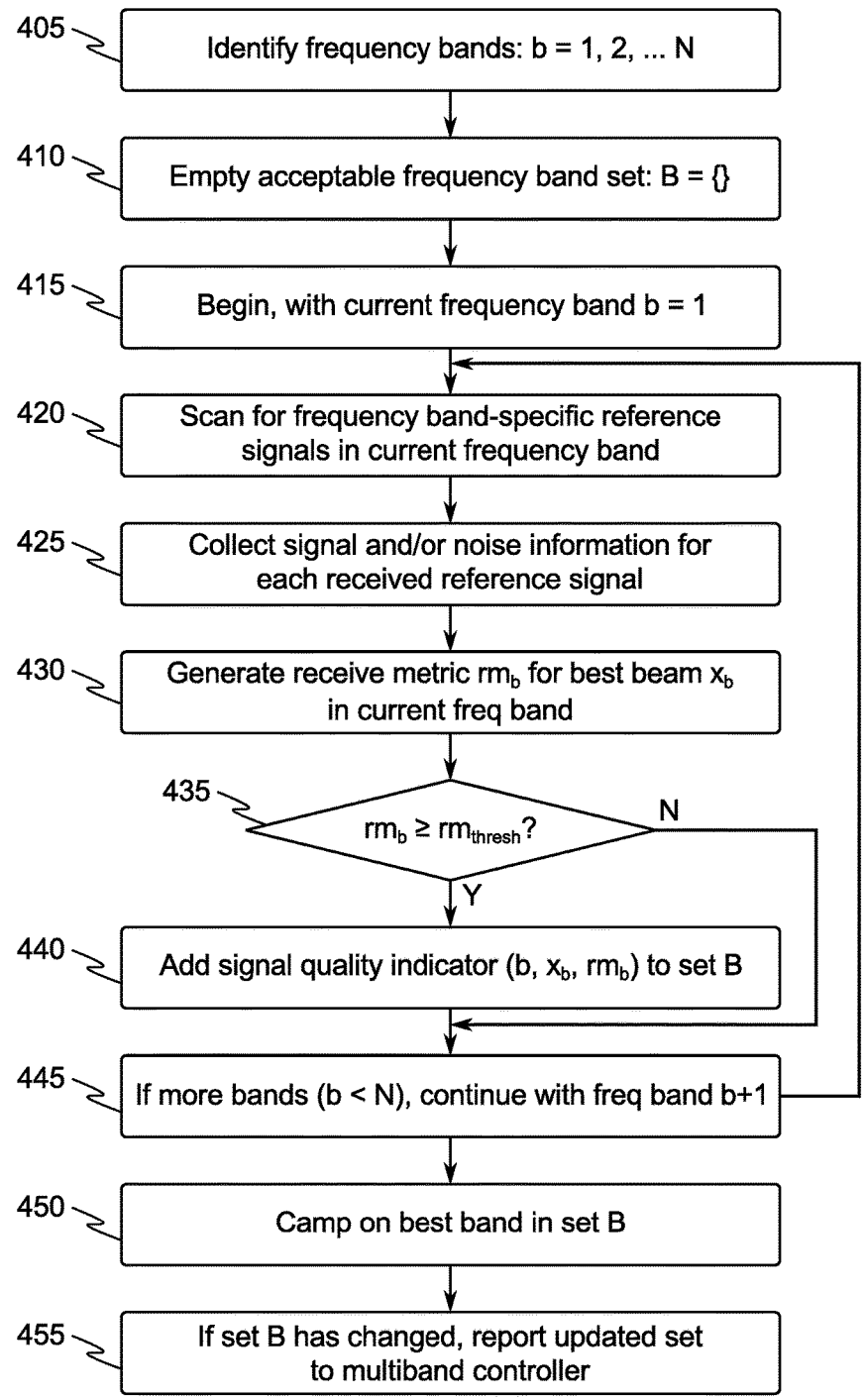
FIG. 4 illustrates an example algorithm or process for band selection and reporting by a UE (user equipment) device.

FIG. 4 illustrates an example algorithm or process for band selection and reporting by a UE (user equipment) device. This may be applied by a UE device interacting via wireless communication with the systems described in connection with FIGS. 1, 2, and 6 of this disclosure. At 405, the UE device identifies an N (N being one or more) millimeter wave frequency bands, enumerated b=1 to N, that the UE device might to use for communicating with a wireless communication network. The identified millimeter wave frequency bands may be determined based on which frequency bands the UE device is, or may be, configured to operate in; for example, although a wireless communication network may provide access via three millimeter wave frequency bands, only two of those frequency bands may be supported by hardware included in the UE device. For the algorithm or process illustrated in FIG. 4, the UE device is presumed to support at least two millimeter wave frequency bands. The identified millimeter wave frequency bands may be determined based on information obtained by the UE device indicating millimeter wave frequency bands provided by the wireless communication network. The identified millimeter wave frequency bands may be determined based on a geographic location or area of the UE device. In some examples, the wireless communication network may provide, via a wireless data message, an identification of the N millimeter wave frequency bands. At 410, the UE device generates an empty acceptable band set B, used to store information about one or more acceptable frequency bands, if any, identified by the algorithm or process illustrated in FIG. 4.

At 415, a current frequency band b is set to the first frequency band (b=1) identified at 405. At 420, the UE device scans for frequency band-specific reference signals in the current frequency band. For example, one or more nearby RRHs operating in the current frequency band may transmit one or more reference signals, some of which may be received by the UE device. The reference signals may be transmitted in various directions via beamforming. Each reference signal may encode or otherwise indicate, expressly or implicitly, the transmitting RRH and/or the direction in which the RRH transmitted the reference signal (which may be referred to the "beam" for the reference signal). In some examples, a recently received reference signal, even if received before 410 or 415, may be used if it was received within a predetermined amount of time. The scanning at 420 may be performed for a predetermined period of time. In some implementations, multiple frequency bands may be concurrently scanned.

At 425, for each of the reference signals received by the UE device at 420, the UE device collects signal and/or noise information. Often, such information is provided by receiver hardware included in the UE device. At 430, the collected signal and/or noise information is used to generate a receive metric, $rm_b$, for the best beam, $x_b$, in the current frequency band b; for example, the best beam $x_b$ may be identified by generating a receive metric for each of the received reference signals and identifying the reference signal (and its associated beam) with the best receive metric. Example receive metrics include, but are not limited to, SINR (signal to interference plus noise ratio), RSRP (reference signal received power), RSRQ (reference signal received quality), SNR (signal to noise ratio), RSSI (received signal strength indication), CIR (carrier to interference ratio), CINR (carrier to interference plus noise ratio), BER (bit error rate), SER (symbol error rate), FER (frame error rate), CQI (channel quality indicator), and RSRP (received signal code power), or a receive metric generated based on one or more of such receive metrics. In some examples, a receive metric may be calculated based on multiple received reference signals. A receive metric may also be referred to as a "communication quality metric." Information about the best beam $x_b$ for the current frequency band b, is stored in association with the generated receive metric $rm_b$.

At 435, the UE device determines whether the receive metric $rm_b$ is greater than or equal to a threshold receive metric value $rm_{thresh}$, assuming higher receive metric values indicate better signal quality. In some examples, a lower value may indicate better signal quality, in which case the determination instead is whether the receive metric $rm_b$ is less than or equal to the threshold receive metric value $rm_{thresh}$. If not ('N'), the current frequency band b is deemed unacceptable for use by the UE device at this time (for example, during an upcoming time slice), and the algorithm or process proceeds to 445. If so ('Y'), the current frequency band b is deemed acceptable, and the algorithm or process proceeds to 440. At 440, a signal quality indicator is added to the acceptable band set B for the current frequency band b. The signal quality indicator may include, for example, the number for the current frequency band (b), a frequency for the current band ($f_b$, which may be based on a channel within the current frequency band), the receive metric generated at 430 ($rm_b$), the best beam ($x_b$), and/or an RRH or base station identifier. In some implementations, the acceptable band set B is sorted according to each the receive metric generated for each band at 430. At 445, if there are remaining millimeter wave frequency bands to scan (for example, if b<N), the scanning continues at 420 with the next frequency band (the current band b is incremented to b+1); otherwise, once all of the frequency bands have been scanned, the algorithm or process proceeds to 450 (unless the acceptable band set B is still empty, in which case the algorithm or process is finished).

At 450, the UE device camps on the best band in the acceptable band set B (the band having the best receive metric). The UE device may camp on the best beam $x_b$ identified at 430 for the band on which it camps; the best beam identified for other bands may likewise be used in response to the UE device receiving a command of instruction to switch or change to a different frequency band. In some implementations, if the UE device previously received a command or instruction to camp on a particular band from the wireless communication network (such as a command or instruction to switch frequency bands issued by an MBC, as discussed above in connection with FIGS. 1 and 2), the UE device may not switch to the best band in the acceptable band set B until a predetermined event occurs, such as, but not limited to, passage of a predetermined amount of time since receiving the command or instruction, the receive metric for the best band satisfying a predetermined condition, or a determination that conditions for the UE device or the wireless communication network have sufficiently changed.

At 455, if the acceptable band set B has changed, or has changed significantly, UE device reports the updated acceptable band set B to an associated MBC (such as MBC 175, 275, or 675), such as via a wireless transmission to the wireless communication network. In some implementations, a UE device is configured to report an updated acceptable band set if response to a configurable trigger event. For example, an MBC may specify to a UE device one or more trigger events, much like 3GPP 36.331 5.5.4 Measurement report triggering, defining conditions under which the UE device should report an updated acceptable band set to the MBC. Such trigger events may include, but are not limited to, a receive metric for a current frequency band being better than a threshold, a receive metric for a current frequency band being worse than a threshold, a first receive metric for another frequency band being a threshold amount better than a second receive metric for a current frequency band, a receive metric for another frequency band being better than a threshold, and/or combinations thereof, with predetermined thresholds and/or threshold specified by the MBC.

The algorithm or process illustrated in FIG. 4 may be invoked in response to the UE device booting up, the UE device reconnecting to the wireless communication network due to a link failure (including, for example, a millimeter wave-specific link failure), a command or instruction received from the wireless communication network, and/or periodically to assess any changes in communication conditions.

Figure 5:
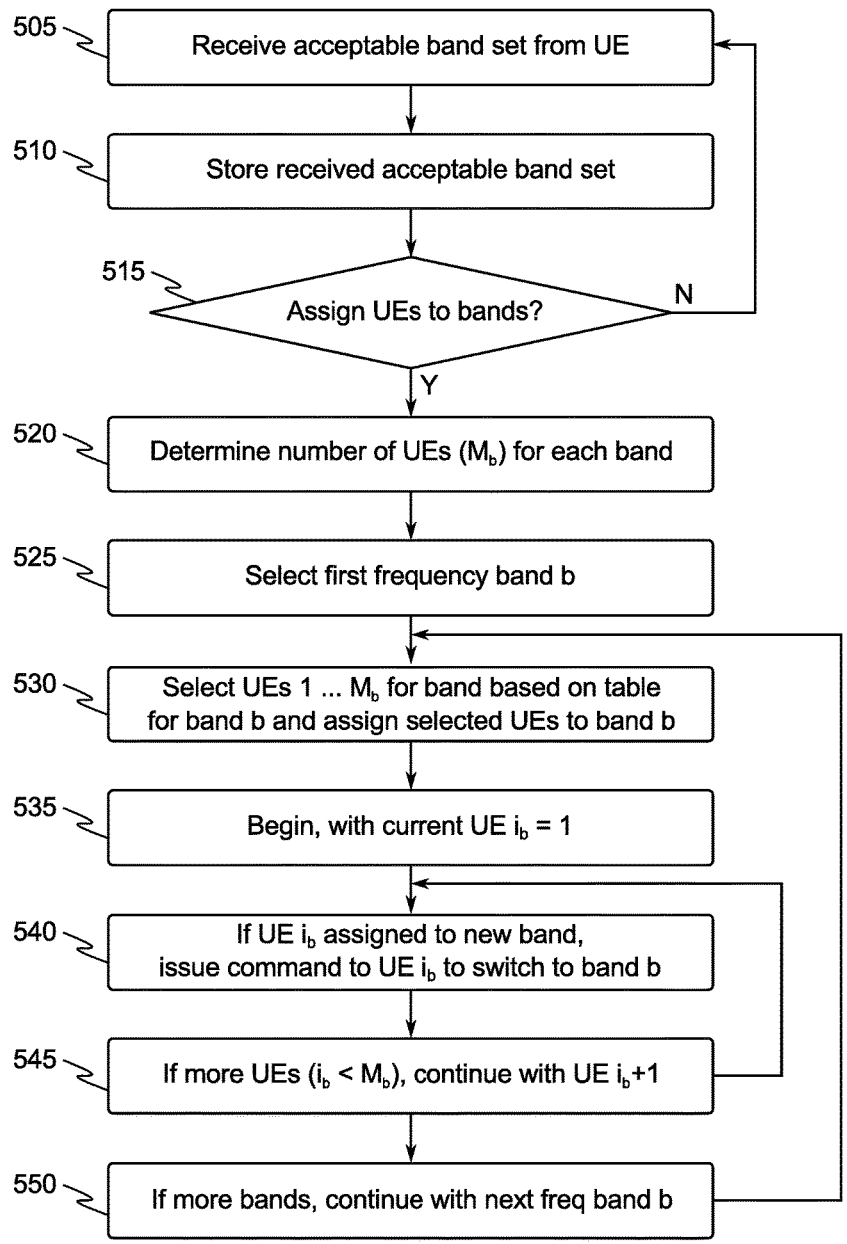
FIG. 5 illustrates an example algorithm or process for assigning one or more UE devices to respective millimeter wave frequency bands by a multiband controller (MBC).

FIG. 5 illustrates an example algorithm or process for assigning one or more UE devices to respective millimeter wave frequency bands by a multiband controller (MBC), such as MBC 175, 275, or 775. At 505, the MBC receives an acceptable band set, such as the acceptable band set discussed above for 455, from a UE device, providing signal quality indicators for the UE device for one or more millimeter wave frequency bands managed by the MBC. There are various circumstances that may result in a UE device reporting an acceptable band set to the MBC, as discussed above for 455 in FIG. 4.

At 510, the MBC stores the acceptable band set received at 505. For example, the acceptable band set, or signal quality indicators or receive metrics included therein, may be stored in association with an identifier for the UE device and/or an existing record for the UE device in a memory device and/or a storage device. In some implementations, acceptable band sets, or portions thereof, for multiple UEs are stored in one or more tables. For example, for each of the millimeter wave frequency bands managed by the MBC, there may be a respective table with a row or other entry for each UE device that has reported an acceptable band set or for each UE device that has reported an acceptable band set including a signal quality indicator or a receive metric for the band. In some examples using SNIR as a receive metric, where an acceptable band set does not include an SNIR for a band, an SNIR value of $-\infty$ (negative infinity) may be used to for the UE device for the band. In some implementations, the MBC may be configured to arrange and/or maintain such tables in a sorted order as new or updated acceptable band sets are received. For example, the MBC may be configured to maintain a table for a band in ascending or descending order according to a receive metric for each UE device in the band. For a UE device not already included in a table, this may include insertion of a row or other entry in the table at an index or other position corresponding to a receive metric for the UE device and receive metrics for other UE devices already in the table. For an updated acceptable band set for a UE device already included in a table, an existing record or entry may be revised or replaced and records or entries in the table, including the UE device for the updated acceptable band set, may be moved or rearranged to maintain a sorting according to receive metric. In some implementations, a sorted list or vector of UE devices may be used instead of a table.

At 515, the MBC determines whether to assign one or more UE devices to frequency bands. In some implementations, the MBC is configured to periodically assign all active UE devices to the millimeter wave frequency bands managed by the MBC. In some implementations, in response to receiving an acceptable band set at 505 from a UE device that is connecting or reconnecting to a wireless communication network for the MBC, the assigning may be performed according to a new-UE-device mode that will only issue frequency band switching commands to one or more UE devices that recently connected or reconnected to the wireless communication network. In some implementations, the determination at 515 may be performed in response to an event, such as, but not limited to, expiration of a timer or receipt of a predetermined number of acceptable band sets. If the MBC determines not to assign UE devices to frequency bands ('N'), the algorithm or process returns to 505. If the MBC determines to assign UE devices to frequency bands ('Y') the algorithm or process continues to 520.

At 520, the MBC determines a number of UE devices to assign to each of the millimeter wave frequency bands managed by the MBC. In some implementations, the MBC is configured to target a ratio of number of users in each frequency band in proportion to the respective bandwidths or capacities of the frequency bands. For example, given a first bandwidth $BW_1$ of 2 GHz for a first band, a second bandwidth $BW_2$ of 4 GHz for a second band, a third bandwidth $BW_3$ of 6 GHz for a third band, and a number M of 180 UE devices, a first number $M_1$ of 30 UE devices for the first band, a second number $M_2$ of 60 UE devices for the second band, and a third number $M_3$ of 90 UE devices for the third band. The bandwidth or capacity for each frequency band may be predetermined for each frequency band (for example, based on an amount of spectrum or theoretical capacity), or may be dynamically determined to account for signal conditions, throughput, or other factors actually observed for each frequency band.

At 525, a first frequency band b is selected for a first pass through operations 530, 535, 540, and 545 to assign UE devices to frequency bands. In some implementations, the MBC is configured to proceed through the frequency bands in order of their frequencies, beginning with the lowest band and proceeding up to the highest band. In some implementations, the MBC is configured to proceed through the frequency bands beginning with the highest band and proceeding to the lowest band.

At 530, using the number of UE devices $M_b$ determined for the current band b at 520, the MBC selects $M_b$ UE devices for band b based on a table for band b, and assigned the selected UE devices to band b. For example, the first $M_b$ UE devices in the table may be selected. In some implementations, tables for each frequency band may be sorted in ascending order according to SNIR or another receive metric, and the MBC may proceed through bands for assigning UE devices in ascending order of frequency (and as a result, the first frequency band b selected at 525 is the frequency band having the lowest frequency). This may be effective for ensuring service to UE devices at a periphery of a service region controlled by the MBC, as lower frequency bands have lower propagation loss and greater range, so low receive metric values may be used to identify peripherally located UE devices that are unlikely to be served well by higher frequency bands.

At 535, a current UE device, $i_b$, is set to the first of the UE devices selected at 530. At 540, a determination is made whether the UE device $i_b$ has been assigned to a new band (in other words, if the current band b is different from a band the UE device is currently using). A previous band for the UE device (for example, a band the UE device is currently using) may be stored in a record or entry associated with the UE device, and used for this determination. If the determination is positive, the MBC issues an instruction or command to the current UE $i_b$ to switch to the current band b.

At 545, if any of the UE devices selected at 530 remain to be considered (for example, if $i_b<M_b$), the algorithm or process continues at 540 with the next UE device (the current UE device $i_b$ is incremented to $i_b+1$). At 550, if there are any more millimeter wave frequency bands to consider for allocating UE devices, the algorithm or process continues at 530 with the next frequency band, according to an order as described in connection with 525.

If the selection of UE devices at 530 is performed in the new-UE-device mode described above, the above operations 535, 540, and 545 may only be carried out for one or more UE devices that recently connected or reconnected to the wireless communication network. As a result, although addition of recently connected or reconnected UE devices might outside of the new-UE-device mode result in already connected UE devices being switched to different bands, such switching is not performed in the new-UE-device mode.

Figure 6:
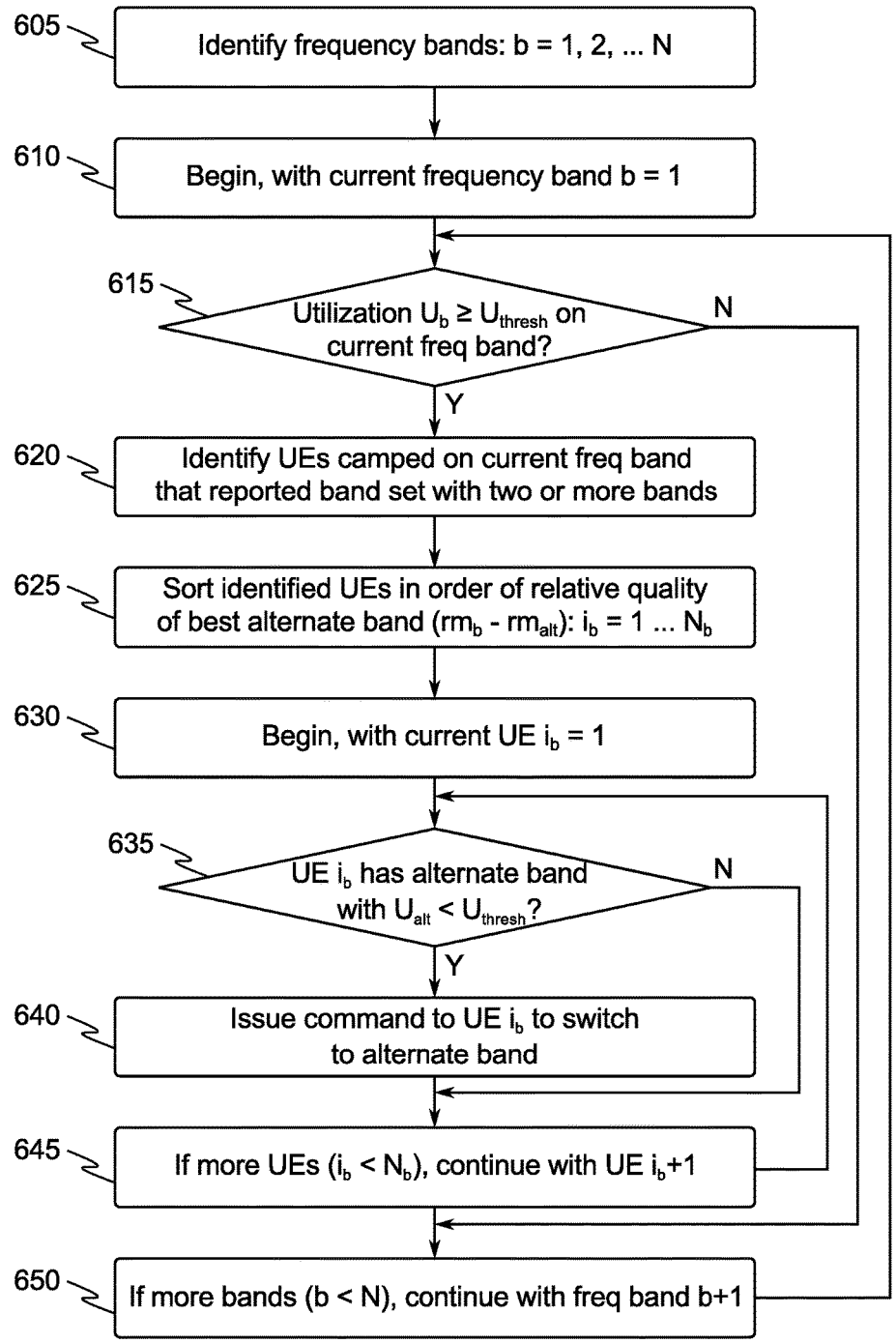
FIG. 6 illustrates an example algorithm or process for multiband load balancing by an MBC.

FIG. 6 illustrates an example algorithm or process for multiband load balancing by an MBC, such as MBC 175, 275, or 775. At 605, the MBC identifies N millimeter wave frequency bands offered by the RRHs associated with the MBC. At 610, a current frequency band b is set to the first frequency band (b=1) identified at 605.

At 615, the MBC determines whether a utilization, $U_b$, for the current frequency band b is greater than or equal to a threshold utilization value $U_{thresh}$. The threshold utilization value $U_{thresh}$ may be different between two frequency bands and be specific to the current frequency band. The threshold utilization value $U_{thresh}$ may be dynamically adjusted based on recently obtained information affecting or reflecting throughput in the current frequency band b. The threshold utilization value $U_{thresh}$ may be determined based on the utilization of other frequency bands. The utilization $U_b$ may be adjusted in response to commands issued to UE devices to switch from the current frequency band b (resulting in a reduced utilization $U_b$ for the current frequency band b) and/or commands issued to UE devices to switch to the current frequency band b (resulting in an increased utilization $U_b$ for the current frequency band b). If the utilization $U_b$ is greater than or equal to a threshold utilization value $U_{thresh}$ ('Y'), the algorithm or process proceeds to 620. If not ('N'), no UE devices are switched to other bands for load balancing, and the algorithm or process proceeds to 650 to assess any remaining frequency bands.

At 620, the MBC identifies a number $N_b$ of UE devices camped on the current frequency band b that have reported an available band set indicating two or more frequency bands as available (see the discussion of FIG. 4, above), one of which is the current frequency band b, and the remaining ones are possible alternate bands for the identified UE devices. At 625, for each of the UE devices identified at 620, the MBC identifies a best alternate frequency band for the UE device; for example, by identifying the alternate band with the smallest difference between the receive metric for the current frequency band ($rm_b$) and the receive metric for the alternate frequency band ($rm_{alt}$). Then, the MBC sorts the identified UE devices in order of the relative quality of each UE device's best alternate frequency band (for example, the value $rm_b$-$rm_{alt}$).

At 630, a current UE device, $i_b$, is set to the first of the UE devices sorted at 625 ($i_b=1$). At 635, MBC determines whether the current UE $i_b$ has an alternate band, alt, with a utilization $U_{alt}$ that is less than a threshold utilization value $U_{thresh}$. In some examples, the threshold utilization value $U_{thresh}$ used at 635 may be specific to each alternate band. The threshold utilization value $U_{thresh}$ used at 635 may be determined based on a number of factors, much as discussed in connection with the threshold utilization value $U_{thresh}$ at 615. In some examples, the MBC may evaluate multiple alternate bands of the current UE $i_b$ in order of their relative quality (for example, in ascending order of $rm_b$-$rm_{alt}$). If the determination at 635 is negative ('N'), the algorithm or process proceed to 645. Otherwise ('Y'), the algorithm or process proceeds to 640, at which MBC issues an instruction or command to the current UE $i_b$ to switch to the alternate band alt identified at 635. In some implementations, MBC may also decrease a utilization value $U_b$ for the current frequency band b, and increase a utilization value $U_{alt}$ for the alternate band alt. In such implementations, if the decreased utilization value $U_b$ is less than the threshold utilization value $U_{thresh}$ for the current frequency band b (see 615, above) or another threshold utilization value, the algorithm or process may proceed to 650.

At 645, if any of the UE devices sorted at 625 remain to be considered (for example, if $i_b<N_b$), the algorithm or process continues at 635 with the next UE device (the current UE device $i_b$ is incremented to $i_b+1$). At 650, if there are any remaining millimeter wave frequency bands to consider for load balancing (for example, if b<N), the algorithm or process continues at 620 with the next frequency band (the current band b is incremented to b+1).

The algorithm or process illustrated in FIG. 6 may be invoked in response to a determination that utilization of one of the millimeter wave frequency bands is greater than or equal to a threshold utilization (which may be specific to each frequency band), receiving reports of alternate bands becoming available for UE devices camped on a heavily utilized frequency band, a significant difference or imbalance in utilization between frequency bands, an expected change in utilization of one or more frequency bands, and/or periodically to assess any changes in utilization and signal qualities reported by UE devices. In some implementations, the algorithm or process illustrated in FIG. 5 may be invoked in response to a determination that the frequency bands managed by an MBC are "unloaded"—in which a total utilization for all of the frequency bands is less than or equal to a threshold utilization, or in which each of the frequency bands has a utilization less than or equal to a threshold utilization (which may be specific to each frequency band, and may be different than the threshold utilization for invoking the algorithm or process illustrated in FIG. 6).

Figure 7:
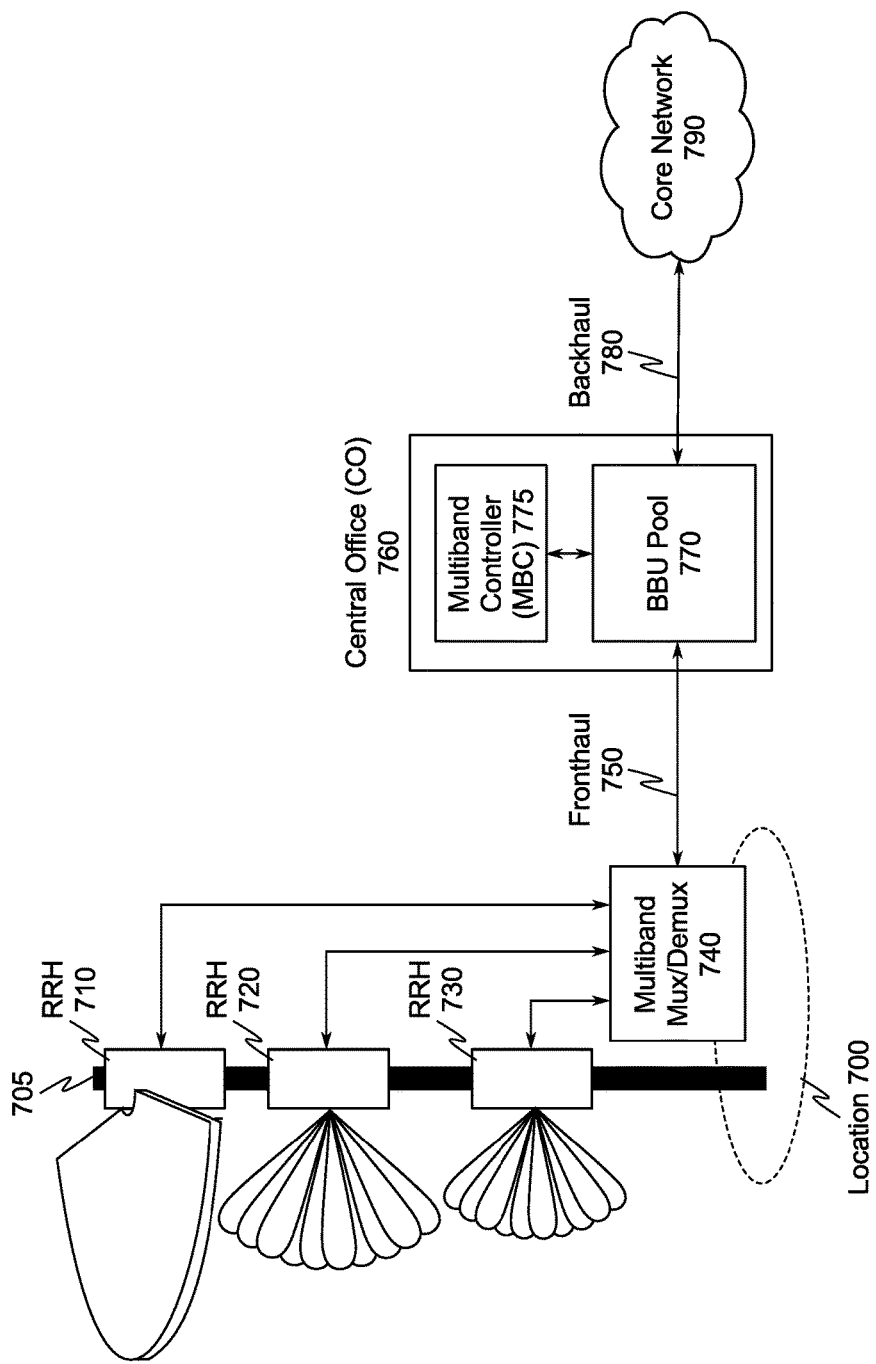
FIG. 7 illustrates an example of a system included in a multiband millimeter wave wireless communication network.

FIG. 7 illustrates an example of a system included in a multiband millimeter wave wireless communication network. RRH 720, RRH 730, multiband mux/demux 740, fronthaul 750, CO 760, BBU pool 770, MBC 775, backhaul 780, and core network 790 are much as described in connection with their counterparts RRH 120, RRH 130, multiband mux/demux 140 (with adaptations to mux/demux for low-band RRH 710), fronthaul 150, CO 160, BBU pool 170 (with adaptations to interact with low-band RRH 710), MBC 175, backhaul 180 in FIG. 1, with millimeter wave RRH 720 and millimeter wave RRH 730 deployed together at geographic location 700. The system illustrated in FIG. 7 further includes a low-band RRH 710 configured to operate, or is operated, in one or more low frequency bands below (having a maximum frequency less than) 6 GHz. Low-band RRH 710 operates according to a low-band RAT, such as, but not limited to, 4G LTE, 3G UMTS, and 2G GSM. Low-band RRH 710, millimeter wave RRH 720, and millimeter wave RRH 730 may be deployed on the same structure 705, as illustrated in FIG. 7. Although FIG. 7 illustrates an example similar to the system illustrated in FIG. 1, the system illustrated in FIG. 2 may be similarly adapted; for example, the low-band RRH 710 may be deployed with the first millimeter wave RRH 220 at geographical location 200, or the low-band RRH 710 may be deployed separate from the geographical locations 200 and 205.

The low frequency band(s) used by low-band RRH 710 can provide wide coverage for initial camping by UE devices; however, the low frequency band(s) has less bandwidth relative to the millimeter wave frequency bands used by RRHs 720 and 730. In some implementations, the low frequency band(s) used by the low-band RRH 710 is used for disseminating system information to, and performing command/control of, UE devices. For example, the low frequency band(s) may be used to provide information about which millimeter wave bands are likely available to a UE device; such information could include, for example, numbers of beams for the millimeter wave bands or RRHs, measurements for each millimeter wave band, rankings of millimeter wave bands, or expectations for millimeter wave bands. Such information may be used by a UE device to determine which band to initially camp on. In some examples, UE devices may transmit the band sets described in connection with FIGS. 4-6 on the low frequency band(s), and some of such transmissions may made be in response to a UE device receiving a page (which may be received via the low frequency band(s)). In some examples, an acknowledgement for data transferred via a millimeter wave frequency band may be transferred via the low frequency band(s).

Figure 8:
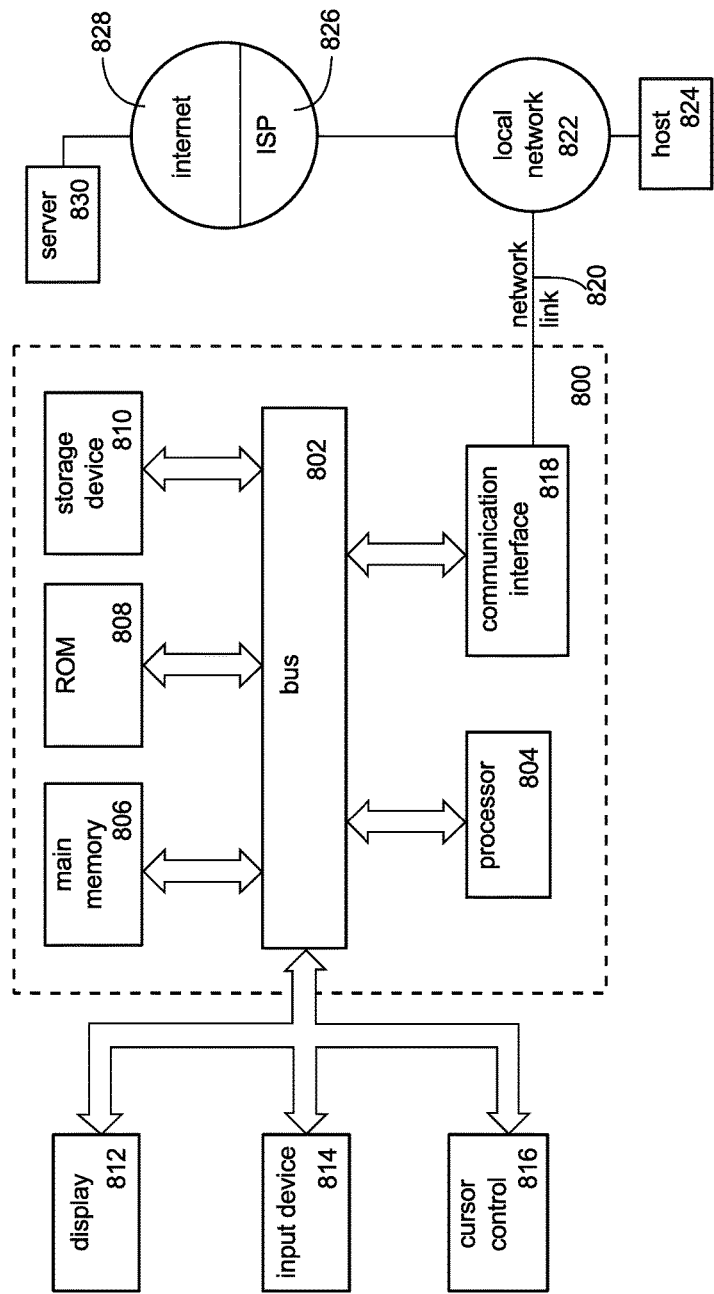
FIG. 8 is a block diagram that illustrates a computer system upon which aspects of this disclosure may be implemented.

FIG. 8 is a block diagram that illustrates a computer system 800 upon which aspects of this disclosure may be implemented, such as, but not limited to, UE devices described herein (including UE devices 310*a*-310*l*); computer processing elements of RRHs 120, 130, 220, 230, 340, 350, 360, 370, 710, 720, and 730; computer processing elements of multiband mux/demuxes 140 and 740; BBU pools 170, 270, and 770; MBCs 175, 275, and 775; and computer systems included in core networks 190, 290, and 790. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT) or liquid crystal display (LCD), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Another type of user input device is a touchscreen, which generally combines display 812 with hardware that registers touches upon display 812.

This disclosure is related to the use of computer systems such as computer system 800 for implementing the techniques described herein. In some examples, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802.

Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information. It is understood that additional communication interfaces may be included for certain aspects of this disclosure (for example, multiband mux/demux 140 illustrated in FIG. 1 may include a first communication interface for first RRH 120, a second communication interface for second RRH 130, and a third communication interface for fronthaul 150).

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system, comprising:
a first remote radio head (RRH) configured to provide wireless communication services in a first frequency band having a first maximum frequency;
a second RRH configured to provide wireless communication services in a second frequency band, wherein the second frequency band has a minimum frequency at least 2 GHz greater than the first maximum frequency;
a baseband unit (BBU) pool communicatively coupled to the first RRH and the second RRH and configured to:
send first radio transmit data to the first RRH for transmission by the first RRH in the first frequency band,
receive first radio receive data from the first RRH received by the first RRH in the first frequency band,
send second radio transmit data to the second RRH for transmission by the second RRH in the second frequency band, and
receive second radio receive data from the second RRH received by the second RRH in the second frequency band; and
a multiband controller configured to:
obtain first signal quality indicators from a first plurality of user equipment (UE) devices for signals received by the first plurality of UE devices from the first RRH and the second RRH, and
in response to the obtained first signal quality indicators, issue a first command to a first UE device included in the first plurality of UE devices and operating in the first frequency band to switch to operating in the second frequency band,
wherein the multiband controller is configured to issue the first command to the first UE device in response to the first signal quality indicators indicating a smaller difference between receive metrics reported by the first UE device for the first and second frequency bands than a difference between receive metrics reported by a second UE device for the first and second frequency bands.

2. The system of claim 1, further comprising:
a third RRH configured to provide wireless communication services in a third frequency band; wherein:
the third frequency band does not overlap the first frequency band;
the third frequency band does not overlap the second frequency band;
the second frequency band has a second maximum frequency;
the third frequency band has a minimum frequency at least 2 GHz greater than the second maximum frequency;
the BBU pool is communicatively coupled to the third RRH and is further configured to:
send third radio transmit data to the third RRH for transmission by the third RRH in the third frequency band, and
receive third radio receive data from the third RRH received by the third RRH in the third frequency band; and
the multiband controller is further configured to:
obtain second signal quality indicators from a second plurality of UE devices for signals received by the UE devices from the third RRH, and
in response to the obtained first and second signal quality indicators, issue a second command to a second UE device included in the second plurality of UE devices operating in the first or second frequency band to switch to operating in the third frequency band.

3. The system of claim 2, wherein the multiband controller is further configured to:
select a third plurality of UE devices from the first and second pluralities of UE devices to be assigned to the first frequency band;
after selecting the third plurality of UE devices, select a fourth plurality of UE devices from the first and second pluralities of UE devices to be assigned to the second frequency band; and
after selecting the fourth plurality of UE devices, select a fifth plurality of UE devices from the first and second pluralities of UE devices to be assigned to the third frequency band.

4. The system of claim 3, wherein the multiband controller is further configured to:
determine that a third UE device included in the fourth plurality of UE devices is not being used on the second frequency band;
in response to the determination that the third UE device is not being used on the second frequency band, issue a third command to the third UE device to switch to operating in the second frequency band.

5. The system of claim 1, wherein the first maximum frequency is greater than 24 GHz and the second frequency band has a minimum frequency greater than 60 GHz.

6. The system of claim 1, wherein:
the BBU pool is further configured to:
send the first radio transmit data to the first RRH via a common fronthaul,
send the second radio transmit data to the second RRH via the common fronthaul,
receive the first radio receive data from the first RRH via the common fronthaul, and
receive the second radio receive data from the second RRH via the common fronthaul;
the first RRH is deployed at a first geographical location; and
the second RRH is deployed at the first geographical location.

7. The system of claim 6, further comprising:
a multiband demultiplexer at the first location and configured to receive the first and second radio transmit data from the BBU pool via the common fronthaul, provide the first radio transmit data to the first RRH, and provide the second radio transmit data to the second RRH; and
a multiband multiplexer at the first location and configured to receive the first radio receive data from the first RRH, receive the second radio receive data from the second RRH, and transmit the first and second radio receive data to the BBU pool on the common fronthaul.

8. The system of claim 1, wherein:
the first RRH includes a plurality of antenna elements used to perform directional beamforming to selectively direct signals transmitted by the first RRH; and
the first signal quality indicators include a first signal quality indicator identifying a UE device that received a reference signal transmitted by the first RRH, a direction in which the reference signal was transmitted by the first RRH, and a receive metric.

9. The system of claim 1, further comprising:
a radio access network (RAN) configured to provide wireless communication services in a third frequency band having a maximum frequency less than 6 GHz; and
one or more computer processors configured to:
receive one or more of the first signal quality indicators from the first UE device via the RAN, and
issue the first command via the RAN,
wherein the first maximum frequency is greater than 24 GHz.

10. The system of claim 1, wherein:
the first signal quality indicators include, for each of a second plurality of UE devices, a respective signal quality indicator for a signal received in the first frequency band;
the first UE device is included in the second plurality of UE devices; and
the multiband controller is further configured to:
identify each of the second plurality of UE devices as camped on the first frequency band,
determine a utilization of the first band by the second plurality of UE devices, and
issue the first command to the first UE device in response to the utilization being equal to or greater than a predetermined threshold utilization.

11. The system of claim 1, wherein
the multiband controller is configured to identify a second UE device included in the first plurality of UE devices as suitable for communication via the first and second frequency bands; and
the BBU pool is further configured to, in response to the identification of the second UE device, use one of the first and second frequency bands for uplink data transfers from the second UE device and use the other one of the first and second frequency bands for downlink data transfers to the second UE device.

12. The system of claim 1, wherein
the multiband controller is configured to determine a first number of the first plurality of UE devices to assign to the first frequency band and a second number of the first plurality of UE devices to assign to the second frequency band based on bandwidths or capacities of the first and second frequency bands.

13. The system of claim 12, wherein the multiband controller is further configured to:
arrange records or entries for UE devices included in the first plurality of UE devices in a first table for the first frequency band;
arrange an order for the records or entries in the first table according to the first signal quality indicators;
select a second plurality of UE devices, with the first number of UE devices, based on the order for the records or entries in the arranged first table; and
assign each of the selected second plurality of UE devices to the first frequency band.

14. The system of claim 1, wherein the multiband controller is further configured to:
arrange records or entries for UE devices included in the first plurality of UE devices in a first table for the first frequency band;
arrange an order for the records or entries in the first table according to the first signal quality indicators; and
select a second plurality of UE devices based on the order for the records or entries in the arranged first table.

15. The system of claim 14, wherein the multiband controller is further configured to:
determine that a second UE device included in the second plurality of UE devices is not being used on the first frequency band;
in response to the determination that the second UE device is not being used on the first frequency band, issue a second command to the second UE device to switch to operating in the first frequency band.

16. The system of claim 1, wherein the first maximum frequency is greater than about 24 GHz.

17. A wireless communication device comprising:
one or more radio transceivers capable of performing wireless communication in a first frequency band having a first maximum frequency, and in a second frequency band, wherein the second frequency band has a minimum frequency at least 2 GHz greater than the first maximum frequency;
one or more processors configured to:
generate a first receive metric for a first reference signal received in the first frequency band,
generate a second receive metric for a second reference signal received in the second frequency band,
transmit, to a wireless communication network, one or more signal quality indicators based on the first and/or second receive metrics,
camp the device on the first frequency band, and
switch, in response to a corresponding command received from the wireless communication network, to camping the device on the second frequency band,
wherein the transmitted one or more signal quality indicators include a difference between the first and second receive metrics,
the difference between the first and second receive metrics is smaller than a difference between receive metrics reported by another wireless communication device, and
the corresponding command is received from the wireless communication network in response to the transmitted difference between the first and second receive metrics being smaller than the difference between receive metrics reported by the other wireless communication device.

18. The wireless communication device of claim 17, wherein the one or more processors are further configured to camp the device on the first frequency band in response to the first receive metric indicating better signal quality than the second receive metric.

19. The wireless communication device of claim 17, wherein the one or more processors are further configured to:
generate a first plurality of receive metrics for respective reference signals received via respective directional beams in the first frequency band, wherein the first plurality of receive metrics includes the first receive metric and the first reference signal was received via a first directional beam;
record the first directional beam as the best beam for the first frequency band in response to the first receive metric being greater than the remainder of the first plurality of receive metrics; and use the first directional beam for the camping the device on the first frequency band.

20. The wireless communication device of claim 17, wherein the one or more processors are further configured to:

generate a first plurality of receive metrics for respective reference signals received via respective directional beams in the second frequency band, wherein the first plurality of receive metrics includes the second receive metric and the second reference signal was received via a first directional beam;

record the first directional beam as the best beam for the second frequency band in response to the first receive metric being greater than the remainder of the first plurality of receive metrics; and use the first directional beam for the camping the device on the second frequency band.

* * * * *